United States Patent [19]

Ponzo

[11] Patent Number: 4,554,760
[45] Date of Patent: Nov. 26, 1985

[54] CRAB TRAP

[76] Inventor: Charles Ponzo, 37 Abby La., Shirley, N.Y. 11967

[21] Appl. No.: 560,339

[22] Filed: Dec. 12, 1983

[51] Int. Cl.⁴ .......................................... A01K 69/10
[52] U.S. Cl. ...................................... 43/105; 43/100
[58] Field of Search ................. 43/100, 101, 102, 103, 43/104, 105

[56] References Cited

U.S. PATENT DOCUMENTS

| | | | |
|---|---|---|---|
| 679,327 | 7/1901 | Newcorn | 43/105 |
| 885,402 | 4/1908 | Thiaville | 43/105 |
| 1,531,299 | 3/1925 | Merle, Sr. | 43/105 |
| 1,968,758 | 7/1934 | Gatch | 43/105 |
| 3,867,782 | 2/1975 | Ortiz | 43/105 |
| 3,903,637 | 9/1975 | Dorsey | 43/105 |
| 4,030,232 | 6/1977 | Niva | 43/105 |
| 4,044,493 | 8/1977 | Fox | 43/105 |

Primary Examiner—Nicholas P. Godici
Assistant Examiner—K. Rowan
Attorney, Agent, or Firm—Michael I. Kroll

[57] ABSTRACT

A crab trap is provided and consists of a plurality of collapsible doors. Each collapsible door is pivotally coupled to one side of a wire mesh bottom panel and slideably coupled to supports for coupling a wire mesh top panel to the bottom panel. A flexible hoist line is connected at each end to each collapsible door. When the crab trap is submerged within water the collapsible doors will collapse opening the crab trap allowing a crab to enter. When the crab trap is pulled up by the hoist line the collapsible doors will slide up closing the crab trap entrapping the crab within.

1 Claim, 3 Drawing Figures

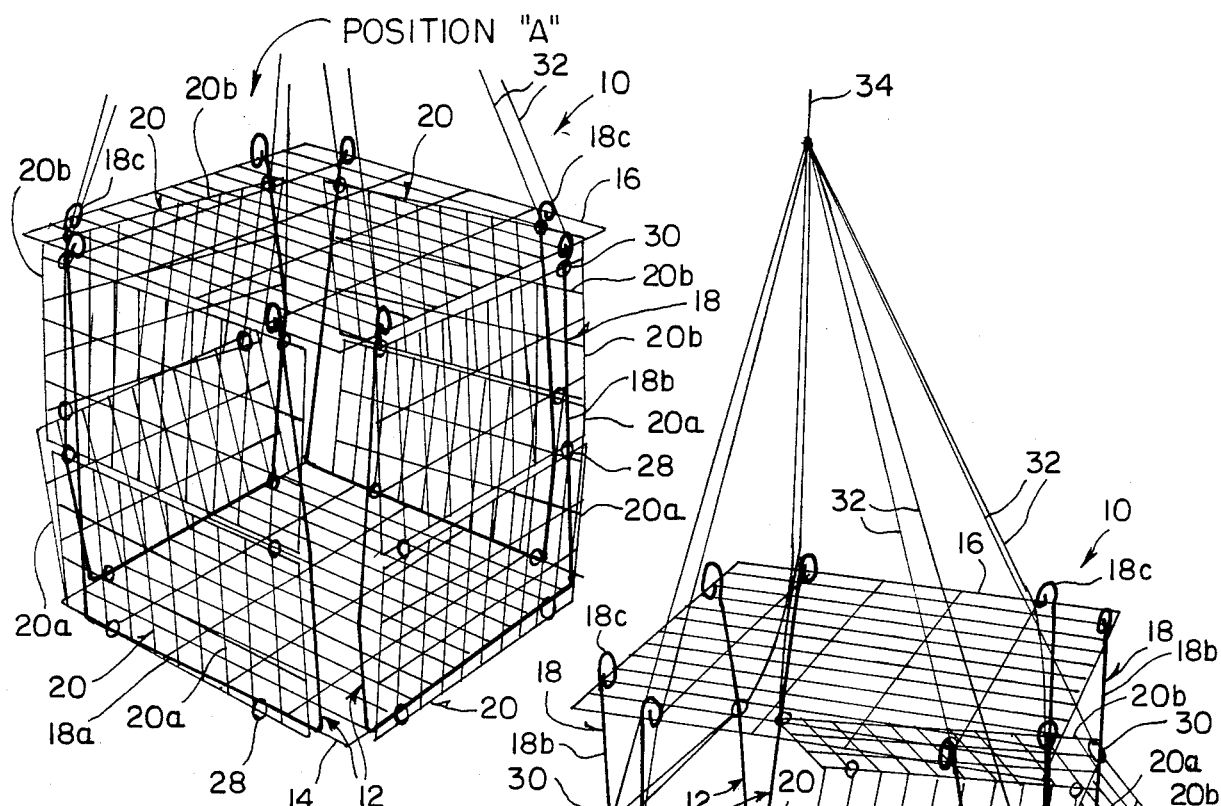
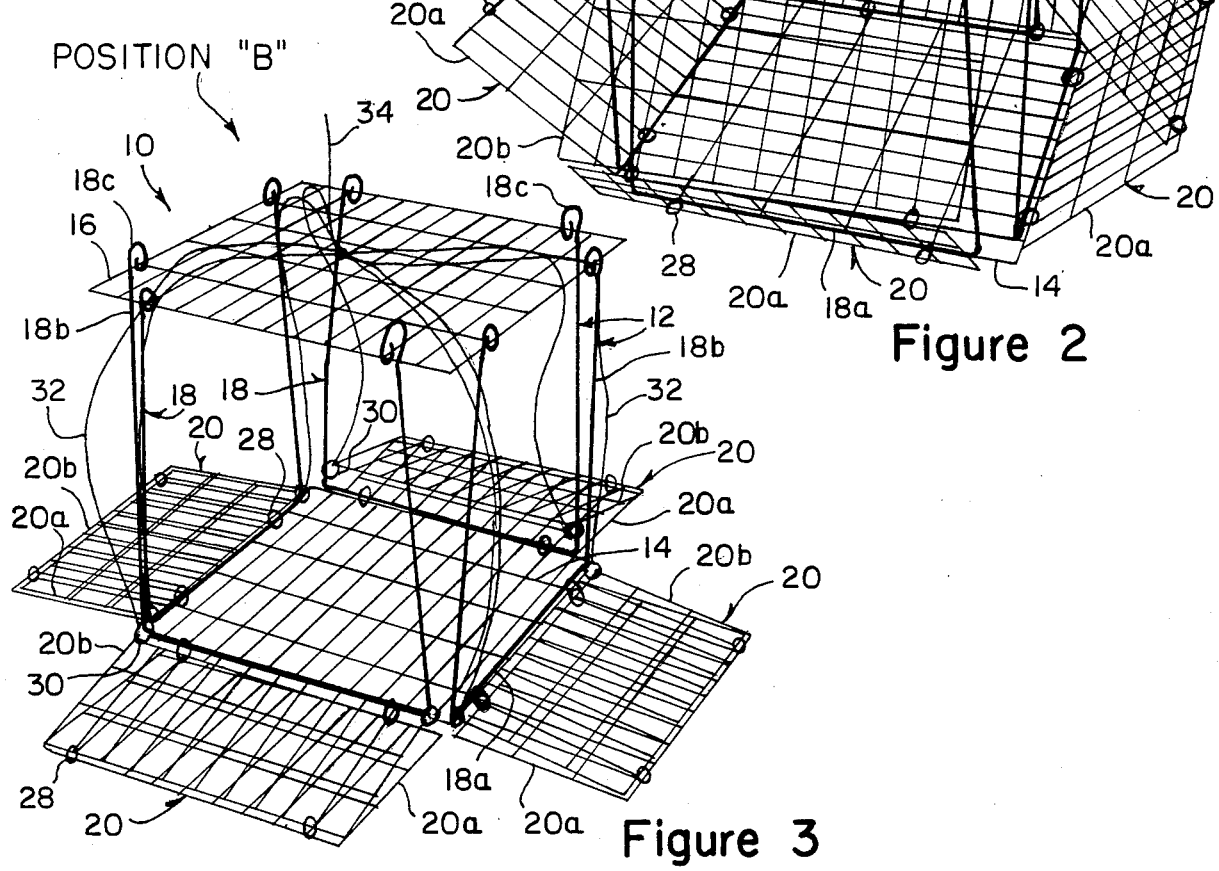

CRAB TRAP

BACKGROUND OF THE INVENTION

1. Field of Invention

The instant invention relates generally to crab traps and more specifically it relates to a crab trap having collapsible doors that fold outwards onto themselves to an open position allowing a crab to enter therein.

2. Description of the Prior Art

Numerous apparatuses have been provided in prior art that are adapted to trap submarine crustaceans. For example U.S. Pat. Nos. 3,867,782; 4,030,232 and 4,044,493 all are illustrative of such prior art. While these units may be suitable for the particular purpose to which they address, they would not be suitable for the purposes of the present invention as heretofore described.

SUMMARY OF THE INVENTION

A principle object of the present invention is to provide a crab trap that has collapsible doors so that when the crab trap is submerged within water the collapsible doors will collapse opening the crab trap allowing a crab to enter.

Another object is to provide a crab trap that has a flexible hoist line attached to the collapsible doors so that when the crab trap is pulled up the collapsible doors will slide up closing the crab trap entrapping the crab within.

An additional object is to provide a crab trap that has collapsible doors containing lower and upper panels pivotally coupled to each other so that when the collapsible doors collapse the upper panels will fold outwards onto the power panels.

A further object is to provide a crab trap that is simple and easy to use.

A still further object is to provide a crab trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention in a closed position with the collapsible doors in a vertical position.

FIG. 2 is a perspective view of the invention in an intermediate position with the collapsible doors in a pivotal angular position.

FIG. 3 is a perspective view of the invention in an open position with the collapsible doors in a folded horizontal position.

DETAILED DESCRIPTION OF THE PREFERRED EMBODIMENTS

Turning now descriptively to the drawings, in which similar reference characters denote similar elements throughout the several views, FIGS. 1 through 3 illustrates a crab trap 10 that consists of a wire mesh bottom panel 14, a wire mesh top panel 16, supports 12, collapsible doors 20 and a flexible hoist line 34.

The wire mesh top panel 16 has a size and shape substantially identical to the bottom panel 14. Supports 12 are for coupling the top panel 16 to the bottom panel 14 so that the top panel is parallel to the bottom panel.

Each collapsible door 20 is pivotally coupled to one side of the bottom panel 14 and slideably coupled to the supports 12. The distance between the top and bottom panels being equal to height of the collapsible doors.

The flexible hoist line 34 is connected at each end 32 to each collapsible door so that when the crab trap 10 is submerged within water the collapsible doors will collapse, as shown in FIG. 3, position "B" opening the crab trap 10 allowing a crab to enter. When the crab trap is pulled up by the hoist line 34 the collapsible doors 20 will slide up as shown in FIG. 1, position "A" closing the crab trap 10 entrapping the crab within.

The supports 12 for coupling the top panel 16 to the bottom panel 14 includes four U-shaped members 18. Each U-shaped member 18 contains a base portion 18a, a pair of arms 18b, 18b and loops 18c. The base portion 18a extends along one side of the bottom panel 14. Each arm 18b extends upwards from a corner of the bottom panel. The loops 18c are for supporting the top panel 16. The loops 18c are affixed to free ends of the arms 18b and engage wires of the top panel.

Each collapsible door 20 consists of a wire mesh lower panel 20a and a wire mesh upper panel 20b. The lower panel 20a is pivotally coupled to one side of the bottom panel 14 and the base portion 18a of the U-shaped member 18. The upper panel 20b is pivotally coupled to the lower panel 20a and is slideably coupled to the pair of arms 18b, 18b of the U-shaped member 18 with the ends 32 of the flexible hoist line 34 attached thereto. When the collapsible door 20 collapses the upper panel 20b will fold outwards onto the lower panel 20a.

The crab trap 10 further contains a plurality of hinge rings 28 for pivotally coupling the collapsible doors 20 and a plurality of slide rings 30 for slideably coupling the collapsible doors 20 on the pair of arms 18b, 18b of the U-shaped member 18 with the ends 32 of the flexible hoist line 34 attached.

To use the crab trap 10 simply place it into the water. Its overall weight and wire mesh panels will allow it to sink to the bottom. The doors 20 being collapsible will fold outwardly flat onto themselves opening the trap so that the crab can enter to get bait placed within the crab trap. When the flexible hoist line 34 is pulled up the collapsible doors 20 will slide up the pair of arms 18b, said arms 18b being part of U-shaped member 18 thus closing the doors entrapping the crab inside of the instant invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

What is claimed is:

1. A trap for a crab, comprising:
   (a) framing means including four U-shaped members;
   (b) a wire mesh bottom panel having corners and sides and connected to said framing means by rings;
   (c) a wire mesh top panel displaced a distance from said bottom panel, connected to said framing means, and having a size and shape substantially identical to and being parallel to said bottom panel;

(d) a plurality of collapsible doors pivotally and slidably connected by rings to said framing means and to said sides of said bottom panel, said plurality of collapsible doors being pivotally connected to said framing means by said rings that attach said bottom panel to said framing means, said plurality of collapsible doors being slidably connected in an up and down direction to said framing means so that said plurality of collapsible doors are prevented from being fouled either by being pulled into the trap or being forced below the trap, said each collapsible door of said plurality of collapsible doors having a height substantially equal to the distance by which said top panel is displaced from said bottom panel, said each collapsible door of said plurality of collapsible doors comprising a wire mesh lower panel pivotally connected to said side of said bottom panel and said base portion of said U-shaped member and a wire mesh upper panel pivotally connected to said lower panel and being slidably connected to said pair of arms of said U-shaped member with said ends of said flexible hoist line attached thereto so that when said each collapsible door collapses said upper panel will fold outwards onto said lower panel, each U-shaped member of said four U-shaped members comprising a base portion extending along a side of said sides of said bottom panel and onto which a collapsible door of said plurality of collapsible doors is pivotally connected and a pair of arms having free ends extending upwards from two corners of said corners of said bottom panel and onto which a collapsible door of said plurality of collapsible doors is slidably connected and loops disposed on said free ends of said pair of arms for affixing said top panel to said framing means; and (e) a hoist line having ends connected to each of said plurality of collapsible doors so that when the trap is submerged and said hoist line is slacked said plurality of collapsible doors open flat allowing the crab to enter the trap and when said hoist line is pulled taut said plurality of collapsible doors slide up said framing means and close the trap which entraps the crab within.

* * * * *